May 3, 1966 YO JONGHE 3,249,039
MACHINE FOR SEVERING AND COMPRESSING SCRAP MATERIAL
Filed April 7, 1964 5 Sheets-Sheet 1

INVENTOR.
Yo Jonghe
BY

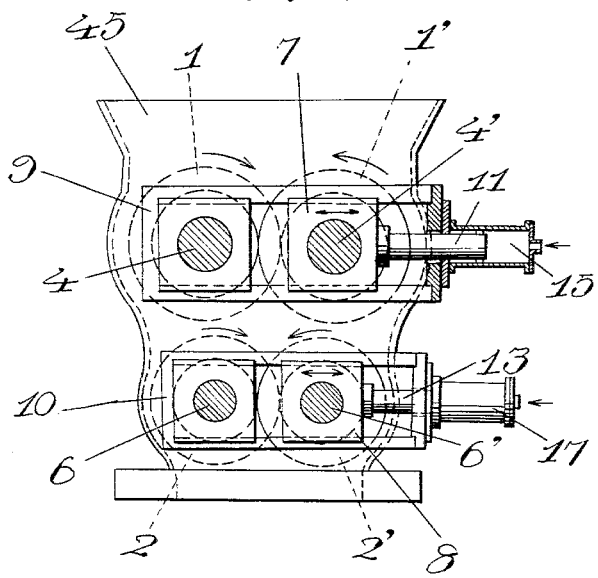
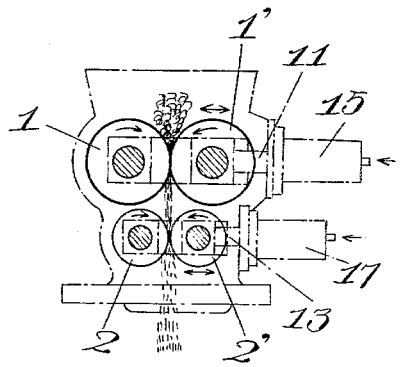
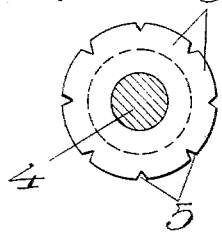
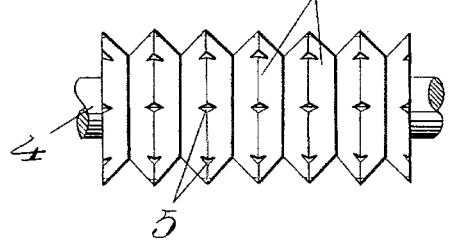
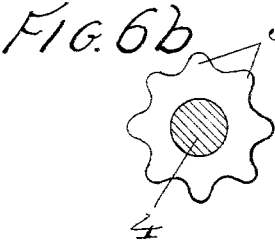
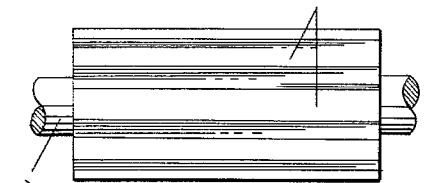

INVENTOR.
Yo Jonghe

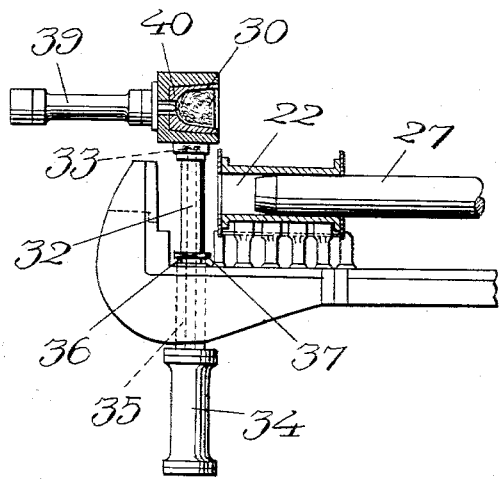
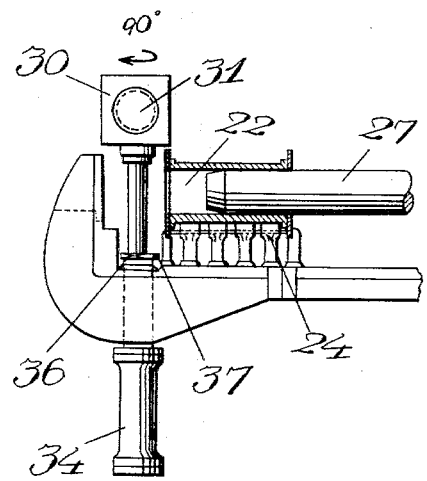
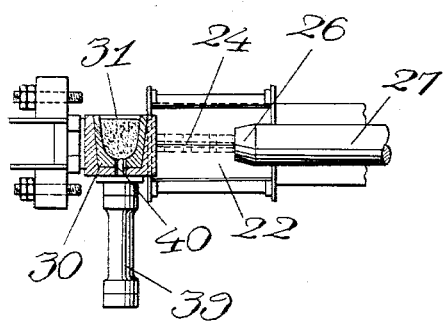
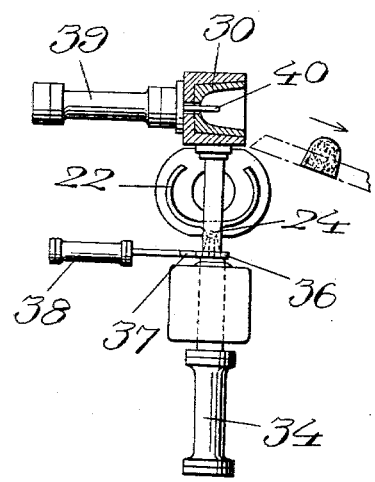
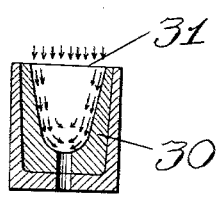

INVENTOR.
YO JONGHE

United States Patent Office 3,249,039
Patented May 3, 1966

3,249,039
MACHINE FOR SEVERING AND COMPRESSING SCRAP MATERIAL
Yo Jonghe, 18 3-chome Nanyodori, Minami-ku, Nagoya, Japan
Filed Apr. 7, 1964, Ser. No. 357,875
8 Claims. (Cl. 100—96)

This is a continuation-in-part of application Serial No. 129,377, filed August 4, 1961 (now abandoned).

This invention relates to a process for compressing strip scrap from metal cutting scrap, such as produced by lathes and the like, by the processes of cutting, compressing and shaping, and a device therefor.

It is an object of this invention to provide a machine for compressing strip scrap from metal cutting operations and employing cutting, metering, compressing and shaping devices therefor.

It is another object of this invention to provide a machine for compressing strip scrap from metal cutting operations efficiently in a very short period of time.

It is a further object of this invention to provide a device for compressing strip scrap from metal cutting operations which is simply constructed and is easy to operate.

It is still further an object of this invention to provide a device for compressing strip scrap from metal cutting operations which is capable of shaping the scrap in a highly compacted manner so that it does not collapse after shaping.

With these and other objects in view and hereinafter set forth, an embodiment of this invention is fully described in the ensuing specification and delineated in the claims appended hereto.

In the attached drawings wherein an embodiment of this invention is illustrated:

FIG. 3 is a section along the line III—III in FIG. 2;

FIG. 4 is an illustration showing the mode of compressing and tearing strip metal cutting scrap;

FIG. 5a shows a plan view of a roller provided in the crushing and tearing mechanism and FIG. 5b a section thereof;

FIG. 6a shows a plan view of another embodiment of the roller and FIG. 6b a section thereof;

Figure 9:
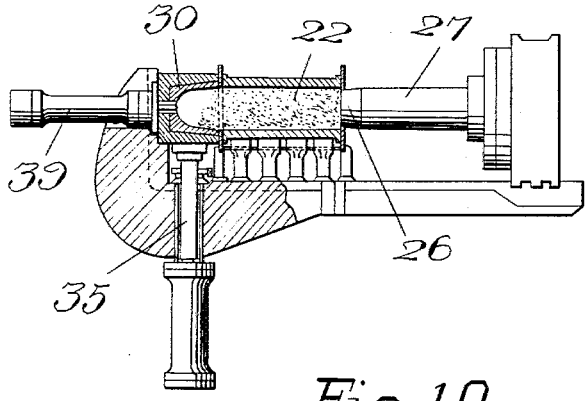
Figure 10:
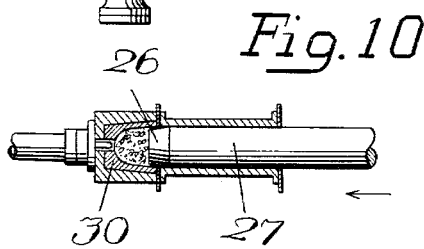
Figure 16:
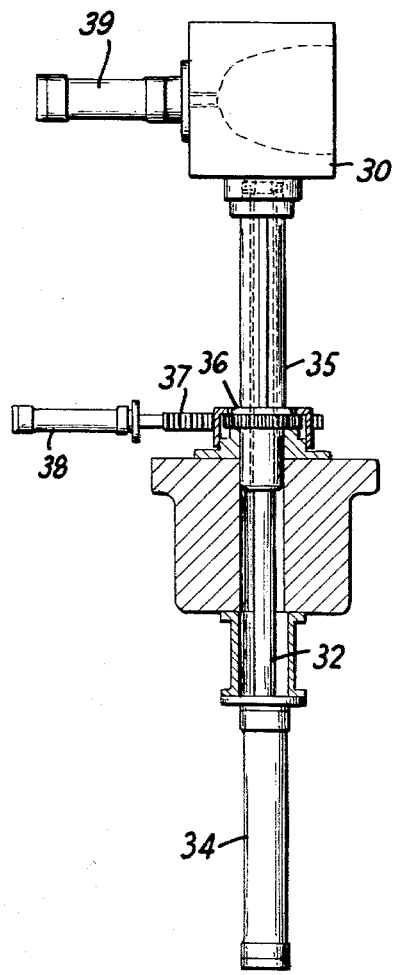

FIGS. 9 to 14 show the stages of operation of the shaping device, FIG. 9 being a semi-diagrammatic side view thereof with scrap compressed into a compressing case, FIG. 10 a semi-diagrammatic partial side view thereof, in its part where the scrap is shaped in a shaping mold thereof, FIG. 11 a side view with the shaping mould placed in the raised position, FIG. 12 a side view corresponding to FIG. 11 with the shaping mould rotated 90 degrees, FIG. 13 a plan view of FIG. 12 and FIG. 14 a section of FIG. 12 showing a compressed product ejected from the shaping mould by an operating rod;

FIG. 15 is an illustration showing the direction of force given to metal cutting scrap being compressed and shaped in a shaping mould; and FIG. 16 is an enlarged elevation view, partly in section, of the shaping mold and its support and operating means.

In carrying out the invention according to one convenient mode described by way of example with reference to the attached drawings, strip scrap from metal cutting operations which is fed through a hopper 45 is severed by means of severing mechanism having a pair of low-speed compressing rollers 1, 1' cooperating with each other and a pair of cooperating high-speed tearing rollers 2, 2' provided below the low-speed compressing rollers 1, 1'. The rollers 1, 1' and 2, 2' have corrugated sufaces 3, as shown in FIGS. 5a and 5b, which extend perpendicularly to their axial directions at regular intervals and are also provided at regular angular intervals with V-shaped grooves 5 on the ridges of the corrugations to assist the pulling and tearing action. Another embodiment of the rollers 1, 1' and 2, 2' is given in FIGS. 6a and 6b, in which corrugated surfaces 3' extend axially at regular angular intervals. The low-speed compressing rollers 1, 1' are adapted to be driven by spindles 4, 4' connected by universal joints to engines, not shown. The strip scrap is compressed, crushed and extended by the low-speed compressing rollers 1, 1' and is fed to the high-speed rollers 2, 2' and is thereby severed by being pulled and torn by said high-speed severing rollers 2, 2'. The high-speed severing or tearing rollers 2, 2' are rotated by spindles 6, 6' connected through universal joints, with a source of motive power. The bearings for the rollers 1, 2 are fixed, but bearings 7, 8 of rollers 1', 2' respectively, are slidable in U-shaped guide seats 9, 10. To each bearing 7, 8, there is attached a piston-rod such as 11 and 13, the free ends of which are slidably contained in hydraulic cylinder units such as 15 and 17. The compressing stresses given to the bearings 7 and 8 are regulated by the pressure given to the hydraulic cylinder units 15 and 17, so that the rollers 1, 1' and 2, 2' are rotated under a predetermined constant pressure, notwithstanding the quantity of the metal cutting scrap passing between the rollers. By varying the pressure given to the bearings according to the quality of the metal scrap passing between the rollers, the bearings give the rollers a good buffer effect so as to ensure that the strip scrap passing between the rollers is effectively compressed and torn, as shown in FIG. 4.

Figure 8:
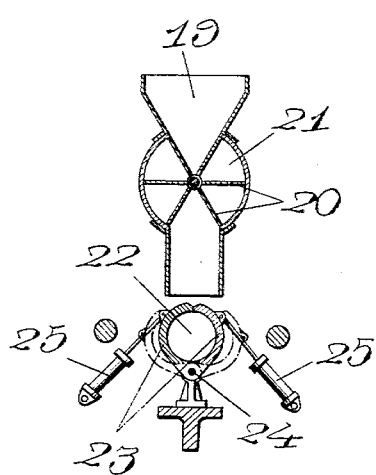
FIG. 8 is an enlarged section along the line VIII—VIII in FIG. 7.

The metal scrap torn as above is then carried through a hopper 19 to a rotary metering device 21 having sectioning vanes 20 rotatably mounted therein (FIG. 8) and effective to deliver measured quantities of scrap at a predetermined rate to a compressing case 22. The compressing case 22 is formed of a cylindrical shape and consists of two arc-shaped members 23, 23, whose section is formed in the shape of a semi-circle. The lower ends of the members 23, 23 are pivoted to a shaft 24 so that they may be opened to receive scrap therein and closed, so as to compress such scrap, by means of pistons 25, 25 connected therewith, as shown in FIG. 8. To one side of and axially aligned with the compressing case 22, there is provided a ram rod 27 connected with a ram 28, said ram rod 27 having a ram head 26 movable, by operation of a piston 29, through the compressing case to compress the scrap therein by pushing it into a shaping mould 30, as shown in FIG. 10. The shaping mould 30 is made of a hard-alloy and is formed, as shown in FIG. 15, in the shape of an artillery shell having a parabolic section, of which an opening 31 faces the front opening of compressing case 22. Attached to the lower surface of shaping mould 30 is a rod 32 (FIG. 16) having a thrust bearing 33, and rod 32 is moved vertically by means of a piston 34, as shown in FIGS. 11 and 16. A tubular member 35 surrounding the rod 32 is fixed to the shaping mould 30 at the lower surface thereof and on the tubular member 35 is positioned a spur gear 36 attached to member 35 by splines for vertical sliding movement. A rack 37 operated by piston 38 and engaging spur gear 36 is effective to rotate the cylindrical member 35, and accordingly to rotate the shaping mould 30, through an angle of 90 degrees in the direction of the arrow shown in FIG. 12, between positions in which the opening in the mould is aligned with or removed from the opening of the compressing case. Furthermore, at the rear end of the shaping mould 30, there is provided a piston 39 having an operating rod 40 extending into the mould and effective to eject the compressed product from the shaping mould, as shown in FIG. 14, when the latter is pushed upward and rotated about an angle of 90 degrees.

Figure 1:
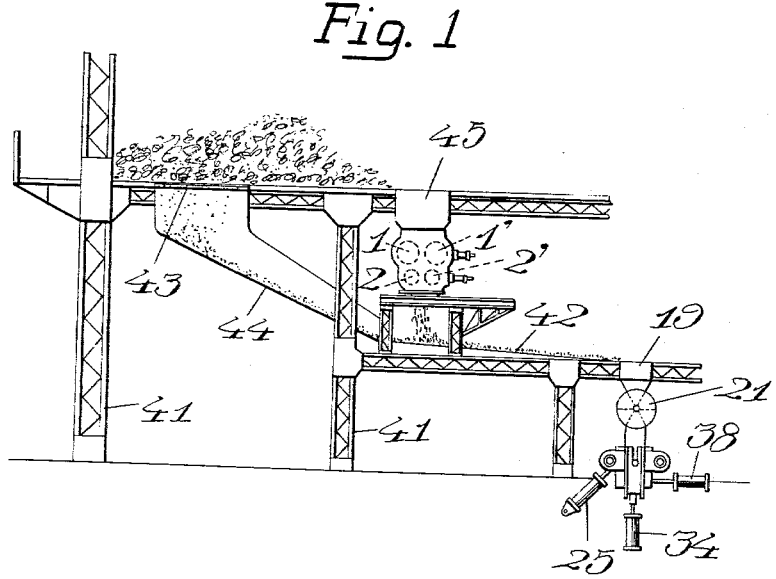
FIG. 1 is a diagrammic view showing arrangements of various parts of the device for compressing strip scrap from metal cutting operations according to this invention.
Figure 2:
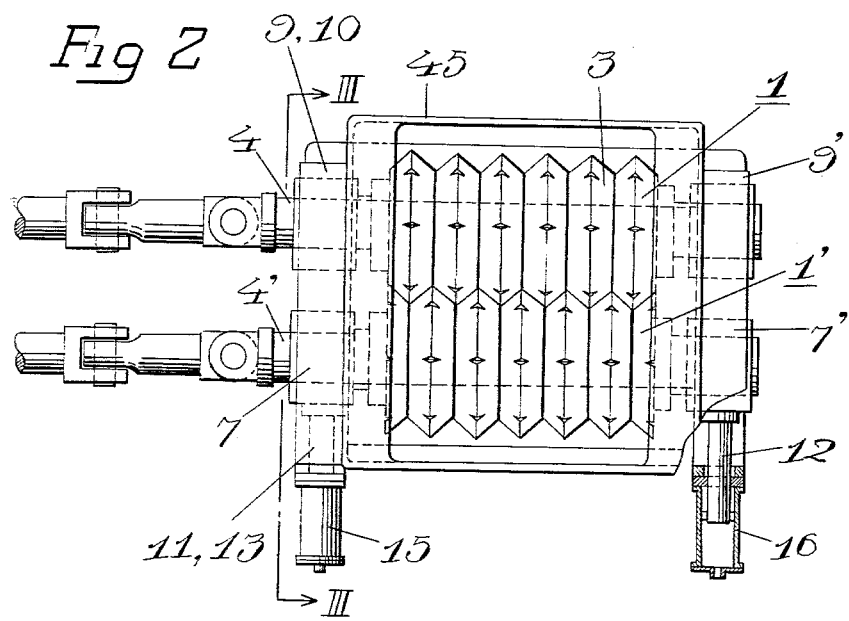
FIG. 2 is a plan view of a crushing and tearing mechanism of the device, with certain parts broken away.
Figure 7:
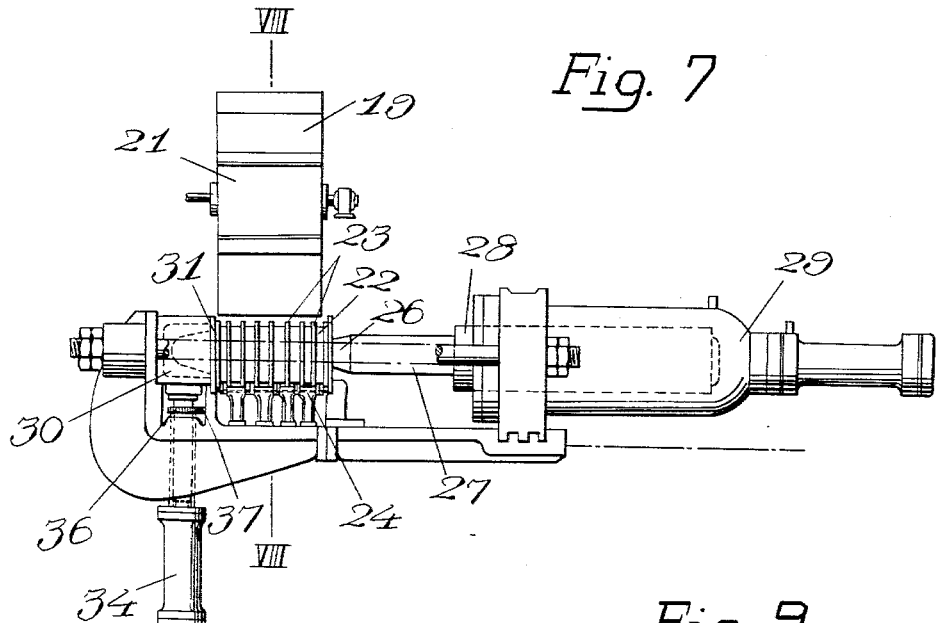
FIG. 7 shows a side view of a compressed mechanism of the device according to this invention.

As shown in FIG. 1, the device according to this invention consists of frame structure 41 mounted on the ground and strip scrap from metal cutting operations carried by a truck or the like means, is placed on a raised floor or platform of the frame and is conveyed to the crushing and tearing mechanism and then to the metering device 21 by means of an inclined plate 42. A predetermined quantity of the scrap is measured by the metering device 21 and is passed to the compressing and shaping device. In addition, there is provided in the raised floor a screen 43 through which strip scrap of smaller size is shifted and is carried to the inclined plate 42 by means of a shaking hopper 44 attached to the screen. Here the scrap of smaller size is mixed with the crushed and torn scrap discharged from said crushing and tearing mechanism and is fed to the metering device.

According to the device of this invention, strip scrap from metal cutting operations, in coil or other shapes as produced by the operation of lathes and the like, is first compressed and torn by the crushing and tearing mechanism and is then carried to the metering device 21 where it is measured to a constant quantity by means of the sectioning vanes 20 and finally moved to the compressing case 22 where it is pressed and shaped by means of the ram rod 27 in the shaping mould 30. All the above operations of crushing, tearing, compressing and shaping may be carried out in continuous succession, which makes the device extremely efficient.

Thus, the device according to this invention can efficiently dispose of a large amount of the scrap by the processes of metering, compressing and shaping in a very short period of time and in continuous succession. Furthermore, as the shaping mould 30 in which the metal scrap is finally compressed in the compressing case 22 is shaped in the form of an artillery shell having a parabolic section, the pressure exerted on the metal scrap is accumulated along the parabolic surface as shown in FIG. 15 and the metal scrap in this way is highly compressed so as to produce a shape so compacted as to prevent its collapse as has been the case by the use of the conventional devices of the kind.

In the known methods of compressing and shaping such metal scrap, box-type pressing machines, small cylindrical presses and friction presses have been used. In case of the box-type pressing machines, however, it has been found difficult to push the scrap into the box as it requires complicated labour and a much longer time. Moreover, as the pressing forces in such machines are exerted on the metal scrap from two or three directions, it is necessary that the machines be complex structures having complicated modes of operation naturally resulting in a longer period of time for a cycle of operations. Furthermore, in the case of the small cylindrical presses hitherto in use, the quantity of the metal scrap to be compressed has been very much limited and the edges of the shaped scrap have been found to easily collapse. Moreover, in compressing scrap by means of friction presses as used hitherto, it has required about twenty strokes for a single cycle of the compressing and shaping operation and these have therefore been extremely inefficient and uneconomical.

According to this invention having the construction, function and the effect as described above, however, all such defects which have occurred in the conventional devices can be eliminated and all the processes can be operated automatically enabling the strip metal scrap to be crushed, torn, compressed and shaped in continuous succession with extreme efficiency.

While I have illustrated and described the preferred embodiment of my invention, it is to be understood that I do not limit myself to the precise constructions herein disclosed and the right is reserved to all changes and modifications coming within the scope of the invention as set forth in the appended claims.

Having thus described my invention, what I claim as new and desire to secure by Letters Patent is:

1. A device for compressing strip scrap from metal cutting operations, such as scrap metal turnings from lathe operations, said device comprising, in combination, scrap severing mechanism including first and second pairs of rollers arranged in sequence; means driving said first pair of rollers at a relatively slow speed and said second pair of rollers at a relatively high speed; said first pair of rollers receiving and crushing strip scrap fed therebetween, and said second pair of rollers tearing the crushed scrap from said first pair of rollers into chips; rotary metering means arranged to receive the torn scrap and deliver metered quantities thereof; an opened-ended compressing casing, having laterally movable walls, receiving such metered quantities of scrap; means operable to move said movable walls to laterally compress the scrap; and means, including a mold alignable with said casing, constructed and arranged to discharge the laterally compressed scrap from said casing into said mold and to compress and shape the scrap into said mold.

2. A device for compressing strip scrap from metal cutting operations, as claimed in claim 1, in which said first pair of rollers is a pair of relatively large diameter rollers having corrugated surfaces extending perpendicular to their axes and spaced uniformly along their axes, said corrugated surfaces being formed, at uniformly angularly spaced intervals around the ridges thereof, with V-shaped grooves; said second pair of rollers being a relatively small diameter pair of rollers having corrugated surfaces.

3. A device for compressing and severing metal cutting scrap, as claimed in claim 2, including means mounting one roller of each pair for movement toward and away from the other roller of the respective pair to adjust the space between the rollers of each pair; and fluid pressure actuator means associated with the movable roller of each pair for adjusting and maintaining the pressure exerted by the rollers of each pair; whereby the quantity of scrap passing between the rollers is controlled and the scrap is effectively crushed and torn under a constant compression stress thereon.

4. A device for compressing metal cutting scrap, as claimed in claim 1, wherein said rotary metering means comprises a housing and a rotary member mounted in said housing, said rotary member having uniformly angular spaced blades defining the metering compartments.

5. A device for compressing metal cutting scrap, as claimed in claim 1, wherein said compressing casing is cylindrical and comprises two semi-cylindrical members pivoted to each other for opening and closing said casing, and wherein said means operable to move said movable walls comprises fluid pressure actuator means operably associated with said semi-cylindrical members to close the same to control the laterally compressed scrap received therebetween.

6. A device for compressing metal cutting scrap comprising, in combination, first means, including a two-part, open-ended, substantially cylindrical casing, arranged to receive metered quantities of compressed and torn scrap and to laterally compress such metered quantities; said casing comprising two semi-cylindrical members pivoted to each other, along a pivotal axis extending therein and parallel to the axis of said casing, for opening and closing said casing, and fluid pressure actuator means operatively associated with each of said semi-cylindrical members to pivot the same about the pivot axis to close the same to control the laterally compressed scrap received therebetween, and second means, including a mold alignable with an open end of said casing, to receive, compress and shape the laterally compressed scrap from said casing; said mold having a cavity formed in the shape of an artillery shell with a parabolic cross section.

7. A device for compressing metal cutting scrap, as claimed in claim 6, in which said second means includes a ram extendable through said compressing casing to force laterally compressed scrap therefrom into said mold and to compact and shape the scrap in said mold.

8. A device for compressing metal cutting scrap, as claimed in claim 6, said second means further including means mounting said mold for movement into and out of alignment with an open end of said casing, and means operable to adjust the angular orientation of said mold with respect to the axis of said casing.

References Cited by the Examiner

UNITED STATES PATENTS

| | | | |
|---|---|---|---|
| 211,566 | 1/1879 | Gwathney | 29—121 |
| 1,053,908 | 2/1913 | Goldschmidt | 100—39 |
| 1,090,914 | 3/1914 | Guettler | 225—100 X |
| 1,202,644 | 10/1916 | Avram. | |
| 1,494,357 | 5/1924 | Hidalgo | 100—170 |
| 1,551,875 | 9/1925 | Hall | 29—121 |
| 1,761,268 | 6/1930 | MacLennan | 241—231 |
| 1,925,949 | 9/1933 | Case. | |
| 2,059,229 | 11/1936 | Gregg | 100—39 |
| 2,087,806 | 7/1937 | McCune | 225—4 |
| 2,686,466 | 8/1954 | Lee | 100—97 |
| 2,691,338 | 10/1954 | Robbins | 100—97 |
| 2,697,249 | 12/1954 | Bettes et al. | 83—345 X |
| 2,810,181 | 10/1957 | Ruchstuhl | 25—15 |
| 2,817,891 | 12/1957 | Zweigle | 25—80 |
| 2,913,764 | 11/1959 | Lowey | 18—16.5 |
| 3,020,589 | 2/1962 | Maritano | 18—16.5 |

FOREIGN PATENTS 112,842  1/1918  Great Britain.

WALTER A. SCHEEL, *Primary Examiner.*